(12) United States Patent  
Sasaki et al.

(10) Patent No.: US 10,807,296 B2  
(45) Date of Patent: Oct. 20, 2020

(54) ROD MEMBER EXTRUSION-MOLDING SYSTEM AND EXTRUSION-MOLDING METHOD THEREFOR

(71) Applicant: JAPAN TOBACCO INC., Tokyo (JP)

(72) Inventors: Hiroshi Sasaki, Tokyo (JP); Masaaki Kobayashi, Tokyo (JP)

(73) Assignee: JAPAN TOBACCO INC., Tokyo (JP)

( * ) Notice: Subject to any disclaimer, the term of this patent is extended or adjusted under 35 U.S.C. 154(b) by 547 days.

(21) Appl. No.: 14/982,717

(22) Filed: Dec. 29, 2015

(65) Prior Publication Data

US 2016/0107365 A1    Apr. 21, 2016

Related U.S. Application Data

(63) Continuation of application No. PCT/JP2013/069393, filed on Jul. 17, 2013.

(51) Int. Cl.
     B29C 48/92      (2019.01)
     B29C 48/06      (2019.01)
     (Continued)

(52) U.S. Cl.
     CPC .............. B29C 48/92 (2019.02); B29C 48/06 (2019.02); B29C 48/09 (2019.02); B29C 48/355 (2019.02);
     (Continued)

(58) Field of Classification Search
     CPC . B29C 47/00; B29C 47/0009; B29C 47/0016; B29C 47/0023; B29C 47/0054;
     (Continued)

(56) References Cited

U.S. PATENT DOCUMENTS 3,075,327 A * 1/1963 Kimble ................ B65G 49/068  
                                                             53/474  
4,291,808 A * 9/1981 Roloff ...................... B07B 1/14  
                                                             209/668

(Continued)

FOREIGN PATENT DOCUMENTS

DE      10306114 A1    8/2004  
EP      2106901 A1    10/2009  
(Continued)

OTHER PUBLICATIONS

Tomio Minobe, JP-02098411 machine translation. (Year: 1990).*

(Continued)

*Primary Examiner* — Robert C Dye  
*Assistant Examiner* — Sedef E Paquette  
(74) *Attorney, Agent, or Firm* — Birch, Stewart, Kolasch & Birch, LLP

(57) ABSTRACT

A system for executing a rod member extrusion-molding method of the present invention has an extrusion-molding machine of a rod member, a transfer conveyor, a delivery line of the rod member between the extrusion-molding machine and the transfer conveyor, a measurement position defined on the delivery line and dividing the delivery line into an upstream section and a downstream section, a measurement device measuring an outer diameter of the rod member in the measurement position, a first roller conveyor forming a part of the section at least directly upstream of the measurement position, a second roller conveyor forming the downstream section, and a control device performing feedback control of a transfer speed of the transfer conveyor based on the outer diameter obtained in the measurement device.

6 Claims, 4 Drawing Sheets

(51) Int. Cl.
*B29C 48/355* (2019.01)
*B29C 48/88* (2019.01)
*B29C 48/09* (2019.01)
*B29C 48/885* (2019.01)
*B29C 48/00* (2019.01)

(52) U.S. Cl.
CPC .......... *B29C 48/885* (2019.02); *B29C 48/911* (2019.02); *B29C 48/0022* (2019.02); *B29C 2948/926* (2019.02); *B29C 2948/92104* (2019.02); *B29C 2948/92123* (2019.02); *B29C 2948/92428* (2019.02); *B29C 2948/92438* (2019.02); *B29C 2948/92619* (2019.02); *B29C 2948/92923* (2019.02); *B29C 2948/92933* (2019.02); *B29C 2948/92942* (2019.02)

(58) Field of Classification Search
CPC . B29C 47/0066; B29C 47/0842; B29C 47/32; B29C 47/34; B29C 47/52; B29C 47/92; B29C 47/8815; B29C 2947/92; B29C 2947/92104; B29C 2947/92123; B29C 2947/92428; B29C 2947/92438; B29C 2947/926; B29C 2947/92619; B29C 2947/92923; B29C 2947/92933; B29C 2947/92942; B29C 64/20; B29C 64/218; B29C 67/00; B29C 67/0014; B29C 49/00; B29C 49/04; B29C 43/44; B29C 59/04; B29C 69/006; B29C 2948/92123; B29C 48/06; B29C 48/355; A24C 5/18; A24C 5/1857; F16C 13/006; A24B 3/14; B65G 39/00; B65G 39/18; A23P 30/20
USPC .................. 264/40.7; 131/77; 209/517, 535
See application file for complete search history.

(56) References Cited

U.S. PATENT DOCUMENTS

| | | | |
|---|---|---|---|
| 5,706,834 A | 1/1998 | Meiring et al. | |
| 5,727,571 A | 3/1998 | Meiring et al. | |
| 6,536,597 B1* | 3/2003 | Farne | G01N 27/041 209/517 |
| 2002/0125595 A1* | 9/2002 | Tunc | B29C 47/0004 264/40.1 |
| 2006/0201057 A1 | 9/2006 | Hosoya et al. | |
| 2007/0193593 A1 | 8/2007 | Baba et al. | |
| 2008/0088049 A1 | 4/2008 | Dostal | |
| 2009/0206313 A1* | 8/2009 | Kelley | B29B 17/0042 256/65.11 |
| 2011/0129564 A1 | 6/2011 | Christensen et al. | |
| 2014/0303278 A1* | 10/2014 | Ferreira | C08J 3/201 523/125 |

FOREIGN PATENT DOCUMENTS

| | | | | |
|---|---|---|---|---|
| JP | 02098411 A | * | 4/1990 | ............. B29C 35/10 |
| JP | 7-16996 A | | 1/1995 | |
| JP | 8-332067 A | | 12/1996 | |
| JP | 3472591 B2 | | 12/2003 | |
| JP | 2008-94054 A | | 4/2008 | |
| WO | WO 2005/046364 A1 | | 5/2005 | |
| WO | WO 2006/046422 A1 | | 5/2006 | |
| WO | WO 2008/0488778 A2 | | 4/2008 | |
| WO | WO 2009/143840 A2 | | 12/2009 | |

OTHER PUBLICATIONS

International Search Report for PCT/JP2013/069393 dated Oct. 8, 2013.
European Office Action issued in European Application No. 13889757.4 dated Oct. 24, 2017.

* cited by examiner

ROD MEMBER EXTRUSION-MOLDING SYSTEM AND EXTRUSION-MOLDING METHOD THEREFOR

CROSS REFERENCE TO RELATED APPLICATIONS

This application is a Continuation of PCT International Application No. PCT/JP2013/069393, filed on Jul. 17, 2013 which is hereby expressly incorporated by reference into the present application.

TECHNICAL FIELD

The present invention relates to an extrusion-molding system and extrusion-molding method therefor that are suitable for manufacture of a rod member that provides carbon heat sources for filter cigarettes, for example.

BACKGROUND ART

The carbon heat sources of this kind are obtained by cutting a hollow rod member into predetermined lengths. In manufacture of the rod member, an extrusion-molding system is generally used, and the extrusion-molding system is disclosed in each of Patent Documents 1 and 2, for example.

The extrusion-molding systems in Patent Documents 1 and 2 include extrusion-molding machines and transfer conveyors, the transfer conveyors receive the rod members which are molded and extruded by the molding machines, and transfer the received rod members to treatment stages as subsequent stages. Further, both the aforementioned extrusion-molding systems are respectively equipped with control devices for keeping outer diameters of the rod members in fixed ranges, and these control devices both keep the outer diameters of the rod members in the fixed ranges by controlling the transfer speeds of the transfer conveyors.

PRIOR ART DOCUMENT

Patent Document

Patent Document 1: Japanese Patent Publication No. H07-16996
Patent Document 2: Japanese Patent Laid-Open No. 2008-94054

SUMMARY OF THE INVENTION

Problems to be Solved by the Invention

The rod members in Patent Documents 1 and 2 are both formed from resin materials, and therefore have relatively high shape retainability. Here, the shape retainability expresses the property with which the outer shape of the rod member is retained to such an extent that the rod member is not deformed by its own weight. Therefore, the aforementioned control devices are considered to be effective in controlling the outer diameters of the rod members in the fixed ranges while retaining the outer shapes of the rod members.

However, since a rod member for providing carbon heat sources is formed from a mixture of granulated carbon as a main component and additives such as a binder, the moisture content of the mixture is relatively high for the purpose of sufficiently securing kneadability of the mixture and flowability of the mixture in the extrusion-molding machine.

Therefore, since the rod member which is directly after extrusion molding also has a high moisture content, the rod member is low in shape retainability that keeps the outer shape, and when the rod member is received by the transfer conveyor directly from the extrusion-molding machine, the rod member is subjected to plastic deformation, and cannot stabilize the outer diameter of the rod member.

Meanwhile, in order to ensure the shape retainability of the rod member after extrusion molding of the mixture, a certain degree of hardness needs to be given to the rod member. Consequently, the flowability which expresses flowing easiness of the mixture in the extrusion-molding machine cannot help becoming worse, and a delivery speed of the rod member from the extrusion-molding machine easily varies. Such variation in the delivery speed also causes plastic deformation of the rod member, and becomes the factor of varying the outer diameter of the rod member.

An object of the present invention is to provide a rod member extrusion-molding system and an extrusion-molding method therefor that can keep an outer diameter of a rod member within an allowable range, even when a moisture content and viscosity of the rod member which is directly after extrusion molding are high.

Means for Solving the Problems

The aforementioned object is achieved by a rod member extrusion-molding system in the present invention, and the extrusion-molding system includes
an extrusion-molding machine extruding a rod member,
a delivery line receiving the rod member extruded from the extrusion-molding machine,
a transfer conveyor receiving the rod member from the delivery line, and transferring the received rod member,
a measurement device measuring an outer diameter of the rod member when the rod member passes through a measurement position defined on the delivery line, and outputting a measurement result, and
a control device performing feedback control of a transfer speed of the rod member by the transfer conveyor, based on the measurement result of the measurement device,
wherein supposing that the delivery line is divided into an upstream section at the extrusion-molding machine side and a downstream section at the transfer conveyor side with respect to the measurement position, the delivery line includes
a first roller conveyor forming a part of the upstream section at least directly upstream of the measurement device, and guides delivery of the rod member, and
a second roller conveyor forming the downstream section, and guides the delivery of the rod member.

According to the aforementioned extrusion-molding system, the rod member which is extruded by the extrusion-molding machine is delivered along the delivery line from the extrusion-molding machine, the delivery line including the first roller conveyor and the second roller conveyor, and then is received by the transfer conveyor from the delivery line to be further transferred to a subsequent step by the transfer conveyor.

Meanwhile, the outer diameter of the rod member is measured by the measurement device in the course that the rod member is delivered along the delivery line, and based on the measurement result therein, feedback control of the transfer speed of the rod member by the transfer conveyor is performed.

As described above, the rod member is delivered along the delivery line before the rod member is received by the transfer conveyor, and therefore, in the delivery process, pre-drying of the surface of the rod member promotes. By the pre-drying therein, the surface of the rod member is dried to such an extent that the surface of the rod member is not solidified, that is, to such an extent that a crack does not occur to the rod member by extension or contraction of the rod member on the transfer conveyor.

Therefore, even if the moisture content of the rod member is high, shape retainability of the outer periphery in the rod member is enhanced, and in particular, viscosity of the outer periphery in the rod member, that is, viscosity of the outer circumference of the rod member which contacts the delivery line and the transfer conveyor can be reduced, and even when the rod member is received by the transfer conveyor from the delivery line, the rod member is hardly subjected to deformation by plastic deformation. The outer diameter of the rod member does not change due to the plastic deformation therein.

Meanwhile, even if flowability of the mixture in the extrusion-molding machine is low, and the delivery speed of the rod member from the extrusion-molding machine varies, feedback control of the delivery speed of the transfer conveyor, that is, the outer diameter of the rod member is performed as described above. Therefore, even if the rod member is high in both moisture content and viscosity, the outer diameter of the rod member is kept within an allowable range.

The present invention also provides an extrusion-molding method corresponding to the aforementioned system, and the extrusion-molding method also exhibits a function similar to the function of the aforementioned system.

Specific forms of the extrusion-molding system and method of the present invention will be apparent from explanation which will be described later.

Advantageous Effects of the Invention

The rod member extrusion-molding system and the extrusion-molding method therefor of the present invention can keep the outer diameter of the rod member within the allowable range, even if the moisture content and the viscosity of the rod member directly after extrusion molding are both high and highly precise outer diameter control for the rod member is difficult with only the feedback control of the transfer speed in the transfer conveyor.

MODE FOR CARRYING OUT THE INVENTION

Figure 1:
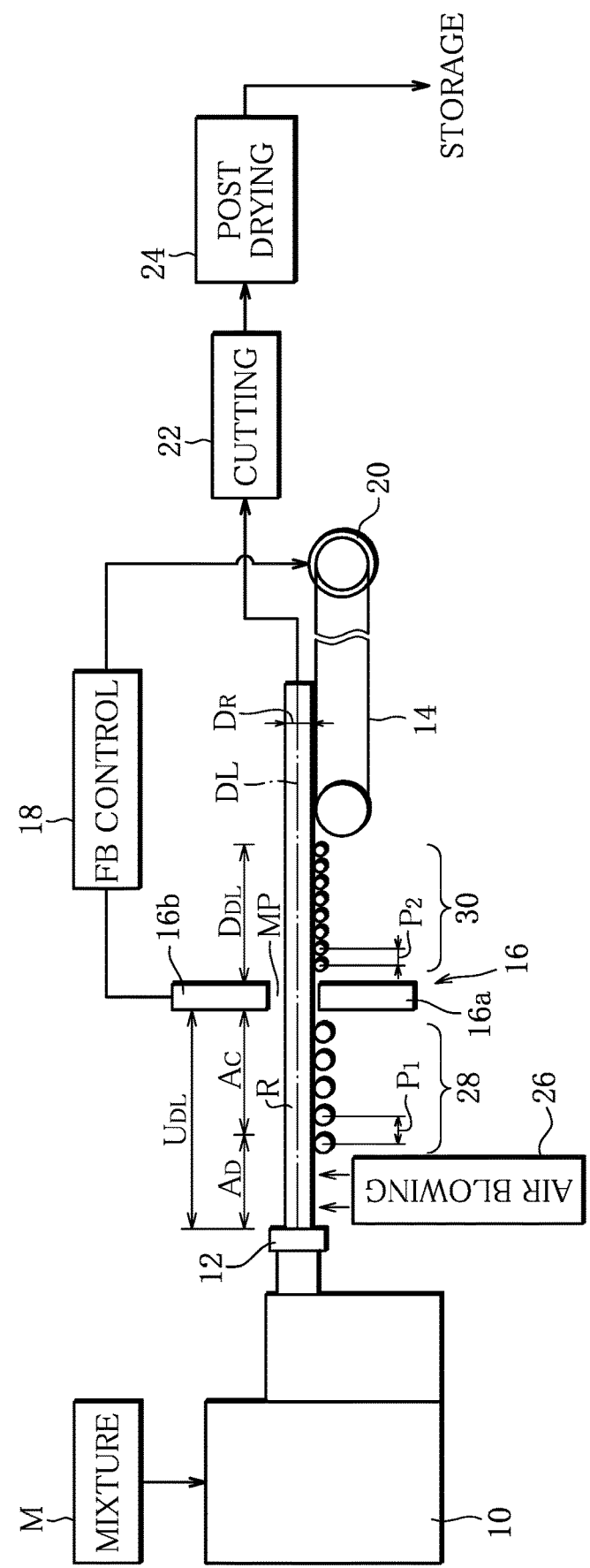
FIG. 1 is schematic view showing a rod member extrusion-molding system of one embodiment of the present invention.

Referring to FIG. 1, a rod member extrusion-molding system is equipped with an extrusion-molding machine 10, and the extrusion-molding machine 10 receives supply of a mixture M. In the case of the present embodiment, the mixture M contains granulated carbon as a main component, a binder, calcium carbonate and water. As the binder, sodium alginate, carboxymethyl cellulose (CMC) or the like is usable, for example, and a moisture content of the mixture M is 20 to 60 wt % or more.

Figure 2:
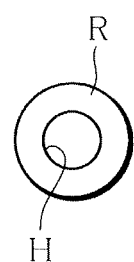
FIG. 2 is an end view of the rod member which is molded and extruded.

The extrusion-molding machine 10 extrudes the mixture M as a circular rod member R while kneading the mixture M, and delivers the molded rod member R along a horizontal delivery line DL that extends from an outlet 12 of the extrusion-molding machine 10. In the case of the present embodiment, the rod member R is hollow in shape as shown in FIG. 2, and has a center hole H. The rod member R may have a hollow shape of a honeycomb structure, a lattice structure or the like, and further may be solid.

A transfer conveyer 14 is horizontally disposed downstream of the delivery line DL, and a predetermined space corresponding to a length of the delivery line DL is secured between the transfer conveyor 14 and the extrusion-molding machine 10. Therefore, the transfer conveyer 14 is connected to the extrusion-molding machine 10 via the delivery line DL, and forms an extension of the delivery line DL. For example, the transfer conveyor 14 is a belt conveyor having a flat belt of silicone.

The aforementioned transfer conveyor 14 receives the rod member R from the delivery line DL, and transfers the received rod member R in a same direction as a delivery direction.

A measurement position MP is defined on the delivery line DL, and the measurement position MP divides the delivery line DL into an upstream section $U_{DL}$ at the extrusion-molding machine 10 side and a downstream section $D_{DL}$ at the transfer conveyer 14 side.

A measurement device 16 is disposed in the measurement position MP, and the measurement device 16 measures an outer diameter of the rod member R when the rod member R passes through the measurement position MP. In the case of the present embodiment, the measurement device 16 includes a light source 16a that is disposed under the delivery line DL, and an outer diameter sensor 16b that is disposed on the opposite side of the delivery line DL to the light source 16a.

The light source 16a emits laser light toward the measurement position MP, whereas the outer diameter sensor 16b can receives the laser light which is emitted from the light source 16a. At this time, the laser light passes through a space that is secured between the upstream section $U_{DL}$ and the downstream section $D_{DL}$.

The outer diameter sensor 16b is not specially limited, but is desirably capable of measuring the outer diameter of the rod member R with high precision. For example, the outer diameter sensor 16b desirably has a resolution that is higher than $1/100$ mm.

When the rod member R is in a situation where the rod member R is continuously delivered on the delivery line DL, the rod member R blocks a part of the laser light from the light source 16a, and the outer diameter sensor 16b receives only a remaining part of the laser light. Therefore, the outer diameter sensor 16b can measure an outer diameter $D_R$ of the rod member R based on the part (a shade portion) of the laser light which is blocked by the rod member R.

The outer diameter $D_R$ (a measurement result) which is measured as above is given to a control device 18 from the outer diameter sensor 16b, that is, the measurement device 16. The control device 18 is electrically connected to a speed control motor 20 that drives the transfer conveyor 14, and as the speed control motor 20, a servo motor or an inverter motor can be used. The control device 18 performs feedback control of a transfer speed of the transfer conveyor 14 via the speed control motor 20, based on the outer diameter $D_R$. Details of the feedback control will be described later.

A cutting section 22 and a post drying section 24 are sequentially disposed downstream of the transfer conveyor 14. The cutting section 22 cuts the rod member R every predetermined length, and forms carbon heat sources in cylindrical shapes from the rod member R. Meanwhile, the post drying section 24 receives the carbon heat sources from the cutting section 22, and applies drying treatment to these carbon heat sources. After post drying treatment like this, the carbon heat sources are stored. In the case of the present embodiment, the carbon heat sources as above are used as carbon heat sources for filter cigarettes. In this case, the diameter of the carbon heat source, that is, the outer diameter $D_R$ of the rod member R is around 6 to 8 mm.

In the case of the present embodiment, the upstream section $U_{DL}$ of the delivery line DL described above is further divided into a pre-drying region $A_D$ and a conveyor region $A_C$. The pre-drying region $A_D$ is disposed at the extrusion-molding machine 10 side, whereas the conveyor region $A_C$ is disposed at the measurement position MP side. The pre-drying region $A_D$ is equipped with an air blower 26 as a pre-drying device. The air blower 26 is disposed under the delivery line DL, and generates air that is directed toward the delivery line DL.

The aforementioned air has a temperature of such a degree that moisture contained in the rod member R is not evaporated rapidly, that is, of such a degree as to prevent an outer surface of the rod member R from being dried rapidly, and if the air like this is blown to the rod member R, the air reduces the viscosity of the outer surface in the rod member R. The rod member R which is directly after extrusion molding in the extrusion-molding machine 10 is in a state cooled to approximately 20° C., for example.

The conveyor region $A_C$ is secured in at least a directly upstream region of the measurement device 16, that is, to the measurement device 16 after the pre-drying region $A_D$, and is formed by a first roller conveyor 28. The first roller conveyor 28 includes a number of rollers, and these rollers are adjacent to one another at predetermined intervals or with pitches $P_1$ along the delivery line DL, and are rotatably supported.

Meanwhile, the aforementioned downstream section $D_{DL}$ is formed by a second roller conveyor 30. The second roller conveyor 30 also includes a number of rollers, and these rollers are adjacent to one another with pitches $P_2$ along the delivery line DL, and are rotatably supported.

As is obvious from FIG. 1, the pitch $P_2$ in the second roller conveyor 30 is shorter than the pitch $P_1$ in the first roller conveyor 28. When the outer diameter $D_R$ of the rod member R is around 6 to 8 mm as described above, each of the rollers of the first roller conveyor 28 has a diameter of 6 to 8 mm, for example, whereas each of the rollers of the second roller conveyor 30 has a diameter that is smaller than the roller diameter of the first roller conveyor 28, for example, a diameter of approximately 2 mm.

Further, in the present embodiment, the pitches $P_1$ and $P_2$ are set at the outer diameter $D_R$ of the rod member R or less.

In the case of the present embodiment, lengths of the conveyor region $A_C$ and the downstream section $D_{DL}$ along the delivery line DL are the same (for example, approximately 120 mm), and the number of rollers in the second roller conveyor 30 is larger than the number of rollers in the first roller conveyor 28. This means that the second roller conveyor 30 provides a larger number of support points to the rod members R as compared with the first roller conveyor 28, and the interval (the pitch $P_2$) between these support points is smaller than the interval (the pitch $P_1$) between the support points in the first roller conveyor 28.

Since the second roller conveyor 30 can support the rod members R at a larger number of support points as compared with the first roller conveyor 28, the second roller conveyor 30 can effectively restricts variation in the outer diameter of the rod member R after the diameter of the rod member R is measured in the measurement position MP, and is suitable in enabling highly precise feedback control to the transfer speed of the transfer conveyor 14.

The respective rollers of the first and second roller conveyors 28 and 30 are formed of stainless steel such as SUS316 or SUS304 of JIS standards. In particular, SUS316 is superior in corrosion resistance as compared with SUS304, and therefore is suitable for the rollers of the first and second roller conveyors 28 and 30.

Further, the rollers may have coating that reduces influence of the viscosity of the rod member R, and for the coating, a fluorine coating, a silicone coating, a diamondlike coating (DLC) or the combination of these coatings, for example, can be used. When the rollers have the aforementioned coating, the rollers may be formed from a resin material to which the rod members R hardly adhere, for example, a polyacetal resin (POM), and a polyether-ketone resin (PEEK), other than the aforementioned stainless steel.

An extrusion-molding method according to the aforementioned system will be described hereinafter.

When the extrusion-molding machine 10 is driven, the extrusion-molding machine 10 extrudes the rod member R of the mixture M, and delivers the rod member R along the delivery line DL (a molding step). Simultaneously with drive of the extrusion-molding machine 10, the transfer conveyor 14 is also driven. At this time, the transfer speed of the transfer conveyor 14 corresponds to a delivery speed of the rod member R.

Thereafter, the rod member R is guided by the first roller conveyor 28 (an initial stage process of a delivery step) via the pre-drying region $A_D$, is subjected to the measurement of the outer diameter $D_R$ by the measurement device 16 (a measurement step), is further guided by the second roller conveyor 30 (a subsequent stage process of the delivery step), and is finally carried on by the transfer conveyor 14 (a transfer step).

As described above, the moisture content of the mixture M, that is, the moisture content of the rod member R which is directly after extrusion molding is relatively high, and the shape retainability of the rod member R at this time point is low. Consequently, if the rod member R is directly received by the transfer conveyor 14 from the extrusion-molding machine 10, the rod member R is plastically deformed on the transfer conveyor 14, and perfect roundness of the rod member R is not guaranteed.

However, in the present embodiment, the aforementioned delivery line DL is ensured between the extrusion-molding machine 10 and the transfer conveyor 14, and therefore, the rod member R which is directly after extrusion molding is delivered along the delivery line DL before the rod member R is received by the transfer conveyor 14. A delivery process of the rod member R like this promotes pre-drying of the outer circumferential surface in the rod member R, enhances the shape retainability of the rod member R, and reduces the viscosity of the outer surface in the rod member R.

In the present embodiment, the upstream section $U_{DL}$ of the delivery line DL includes the pre-drying region $A_D$ which accelerates drying of the rod member R, and the pre-drying region $A_D$ is disposed adjacently to the extrusion-molding machine 10. Therefore, the rod member R which is directly after extrusion molding passes through the pre-drying region $A_D$ first, and at this time, the air from the air blower 26 is blown to the rod member R from below (a drying step). Since the air like this promotes pre-drying of a circumferential surface region of a lower half of the rod member R, that is, a bottom portion of the rod member R, the shape retainability of the bottom portion of the rod member R is especially enhanced.

Although blowing of the air especially promotes pre-drying to the circumferential surface region of the lower half in the rod member R, the pre-drying in this case does not bring about local solidification of the rod member R, that is, nonuniform contraction of the rod member R, and a crack does not occur to the rod member R.

Therefore, even when the rod member R enters the first roller conveyor 28 and the bottom portion of the rod member R is supported by the respective rollers of the first roller conveyor 28, downstream of the pre-drying region $A_D$, the rod member R is not subjected to plastic deformation, and perfect roundness of the rod member R is ensured.

Thereafter, when the rod member R passes the measurement position MP, the outer diameter $D_R$ of the rod member R is measured by the measurement device 16, and delivery of the rod member R is handed over to the second roller conveyor 30 from the first roller conveyor 28.

As described above, the pitches $P_1$ and $P_2$ of the respective rollers in the first and second roller conveyors 28 and 30 are equal to or smaller than the outer diameter $D_R$ of the rod member R, and therefore, when the rod member R is delivered along the delivery line DL, the rod member R sequentially comes into contact with the respective rollers in the first and second roller conveyors 28 and 30 at the intervals equal to or smaller than the outer diameter $D_R$ of the rod member R itself.

Therefore, when the rod member R moves on the first and second roller conveyors 28 and 30, the rod member R does not fall in between the rollers, or does not move in a zigzag direction, an ability to move in a straight line of the rod member R is ensured, and the rod member R can smoothly move on the first and second roller conveyors 28 and 30.

In this regard, if the aforementioned pitches $P_1$ and $P_2$ are larger than the outer diameter $D_R$ of the rod member R, in addition to that the viscosity of the outer surface in the rod member R is high, and the rod member R itself is soft, the rod member R is highly likely to fall in between the rollers, or move in a zigzag direction, and smooth movement of the rod member R is not ensured.

Thereafter, delivery of the rod member R is handed over to the transfer conveyor 14 from the second roller conveyor 30, the rod member R is transferred toward the cutting section 22 and the post drying section 24 in the subsequent stage by the transfer conveyor 14, and is subjected to the aforementioned cutting and post drying treatment.

As described above, the outer circumferential surface of the bottom portion of the rod member R is only pre-dried to such an extent that the bottom portion is not hardened, and therefore, distribution of the moisture amount in the rod member R does not become unbalanced to a large extent seen in a cross-section of the rod member R. Therefore, even when the carbon heat sources are subjected to the post drying treatment in the post drying section 24 in the subsequent stage, a crack does not occur to the carbon heat sources, or the perfect roundness of the carbon heat sources is not reduced.

The belt of the transfer conveyor 14 is formed of silicon, whereas the respective rollers of the first and second roller conveyors 28 and 30 are formed of the aforementioned stainless steel, and therefore, viscosity of the rod member R to the belt and the rollers is low. Therefore, the rod member R is difficult to adhere to the rollers of the first and second roller conveyors 28 and 30 and the belt of the transfer conveyor 14, and therefore the rod member R smoothly passes through the conveyors 28, 30 and 14 without being caught by the first and second roller conveyors 28 and 30 and the transfer conveyor 14.

Further, as is derived from the lengths of the conveyor region $A_C$ and the downstream section $D_{DL}$, and a dimensional relation of the pitches $P_1$ and $P_2$ as described above, the second roller conveyor 30 includes more rollers as compared with the first roller conveyor 28, and can support the rod member R at a large number of support points. This means that periods in which the respective rollers of the second roller conveyor 30 contact the rod member R are shorter than periods in which the respective rollers of the first roller conveyor 28 contact the rod member R, and contributes stable delivery of the rod member R.

In particular, the second roller conveyor 30 is used to deliver the rod member R which is directly after the outer diameter $D_R$ of the rod member R is measured, and therefore, in order to enable execution of feedback control that will be described later with high precision, concerning the transfer speed of the transfer conveyor 14, stable delivery of the rod member R by the second roller conveyor 30 becomes important.

Next, with reference to FIG. 3, the feedback control (a control step) by the control device 18 will be described.

First, it is determined whether or not the extrusion-molding machine 10 and the transfer conveyor 14 are driven (step S1), and when the determination result here is true (Yes), the outer diameter $D_R$ of the rod member R which is measured by the measurement device 16 is read (step S2).

Thereafter, it is determined whether or not the outer diameter $D_R$ is a maximum allowable diameter $D_{MAX}$ or more (step S3), and when the determination result here is true, a deviation $\Delta D$ of the outer diameter $D_R$ from the maximum allowable diameter $D_{MAX}$ is calculated from the following expression (step S4).

$$\Delta D = D_R - D_{MAX}$$

When the determination result in step S3 is false (No), it is determined whether or not the outer diameter $D_R$ is a minimum allowable diameter $D_{MIN}$ or less (step S5). When the determination result in this case is true, a deviation $\Delta D$ of the outer diameter $D_R$ from the minimum allowable diameter $D_{MIN}$ is calculated from following expression (step S6).

$$\Delta D = D_{MIN} - D_R$$

Figure 3:
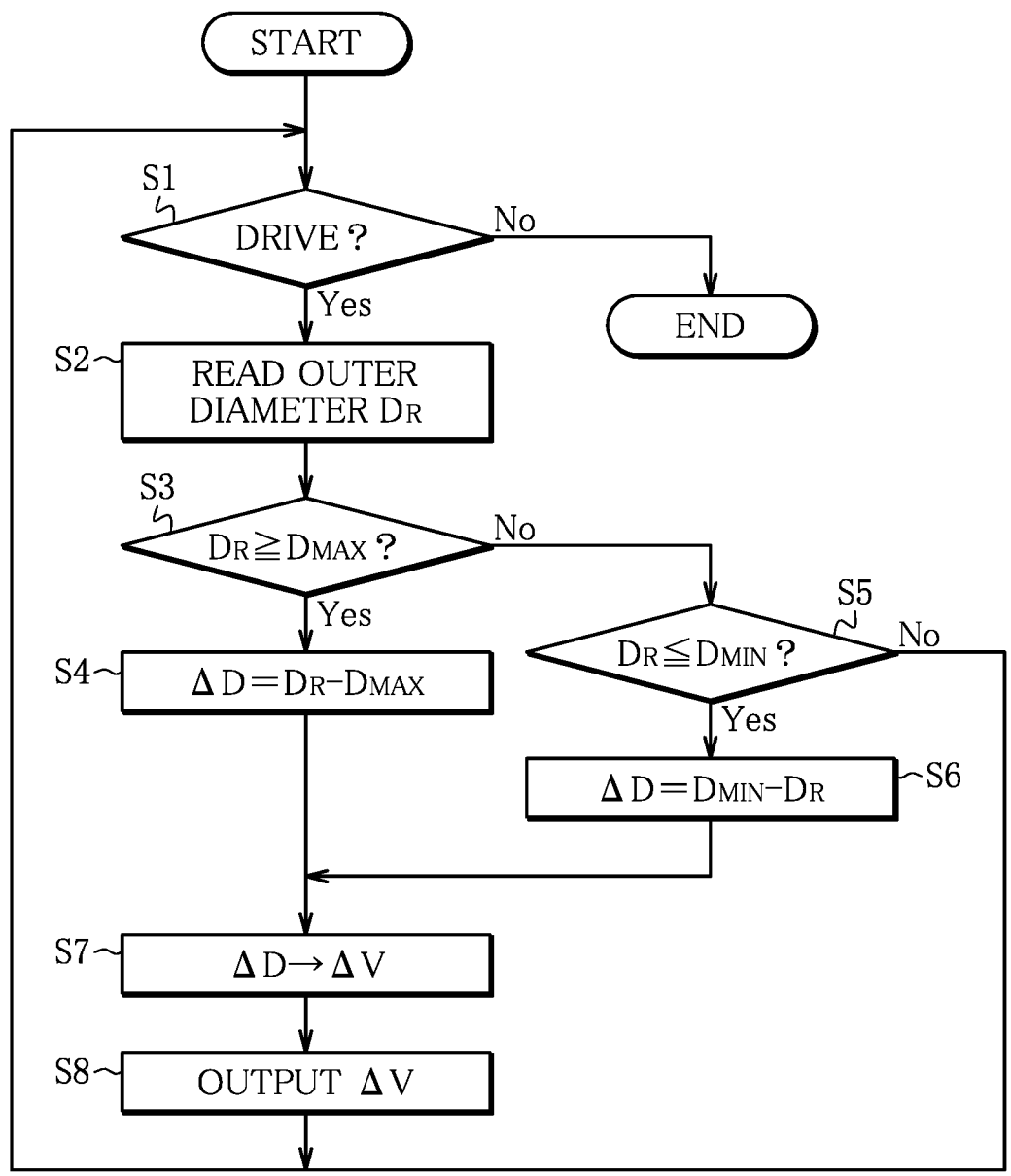
FIG. 3 is a flowchart showing a feedback control routine in the system in FIG. 1.

When the determination result in step S5 is false, step S1 and the following steps are repeatedly executed, and when the determination result in step S1 is false, the control routine in FIG. 3 is ended.

The control device 18 calculates a speed control amount $\Delta V$ for increasing or decreasing the transfer speed of the transfer conveyor 14 based on the aforementioned deviation $\Delta D$ (step S7), and thereafter, outputs the speed control amount $\Delta V$ to the servo motor 20 (step S8).

Accordingly, the servo motor 20 changes the transfer speed of the transfer conveyor 14 based on the speed control amount $\Delta V$. Specifically, if the outer diameter $D_R$ exceeds the maximum allowable diameter $D_{MAX}$, the transfer speed of the transfer conveyor 14 is increased. In this case, the transfer conveyor 14 transfers the rod member R which is delivered from the extrusion-molding machine 10 while pulling the rod member R, whereby the outer diameter $D_R$ of the rod member R is decreased with plastic deformation of the rod member R.

On the contrary, if the outer diameter $D_R$ is smaller than the minimum allowable diameter $D_{MIN}$, the transfer speed of the transfer conveyor 14 is decreased. In this case, the transfer conveyor 14 operates to brake the delivery speed of the rod member R from the extrusion-molding machine 10, and increases the outer diameter $D_R$ of the rod member R with plastic deformation of the rod member R.

A variation in the outer diameter $D_R$ in the rod member R occurs by the delivery speed of the rod member R from the extrusion-molding machine 10 varying, but as a result that the feedback control of the outer diameter $D_R$ is performed as described above, the outer diameter $D_R$ is kept in an allowable range between the maximum allowable diameter $D_{MAX}$ and the minimum allowable diameter $D_{MIN}$.

Since the aforementioned feedback control does not change the drive speed of the extrusion-molding machine 10, that is, a kneading speed for the mixture M, kneading conditions become constant, and the feedback control contributes to stabilization of bulk density and hardness of the rod member R. This means that even when the post drying treatment is executed to the rod member R as the aforementioned subsequent step, a variation in the outer diameter $D_R$ in the rod member R is restricted.

As a result, the outer diameter $D_R$ of the rod member R is stably kept, and quality relating to an external appearance of the rod member R is ensured.

Further, on execution of the feedback control, the belt of the transfer conveyor 14 and the respective rollers of the first and second roller conveyors 28 and 30 are formed of the material to which the rod member R hardly adheres as described above, whereas the bottom portion of the rod member R is subjected to drying treatment in advance, and shape retainability of the bottom portion is high.

Therefore, even if the delivery speed of the rod member R between the extrusion-molding machine 10 and the transfer conveyor 14, that is, on the delivery line DL varies with execution of the feedback control, the respective rollers of the first and second roller conveyors 28 and 30 can rotate in accordance with the speed variation, and execution of stable feedback control is enabled.

Further, since the diameter of each of the rollers of the second roller conveyor 30 is smaller than the diameter of each of the rollers of the first roller conveyor, an inertial mass of each of the rollers in the second roller conveyor 30 is small. Therefore, since each of the rollers of the second roller conveyor 30 rotates effectively in accordance with the variation in the delivery speed of the rod member R, as compared with each of the rollers of the first roller conveyor 28, increase or decrease in the outer diameter $D_R$ of the rod member R by the aforementioned feedback control mainly appears upstream of the measurement device 16, and responsiveness of the feedback control is high.

The present invention is not restricted to the aforementioned one embodiment, but various modifications can be made.

Figure 4:
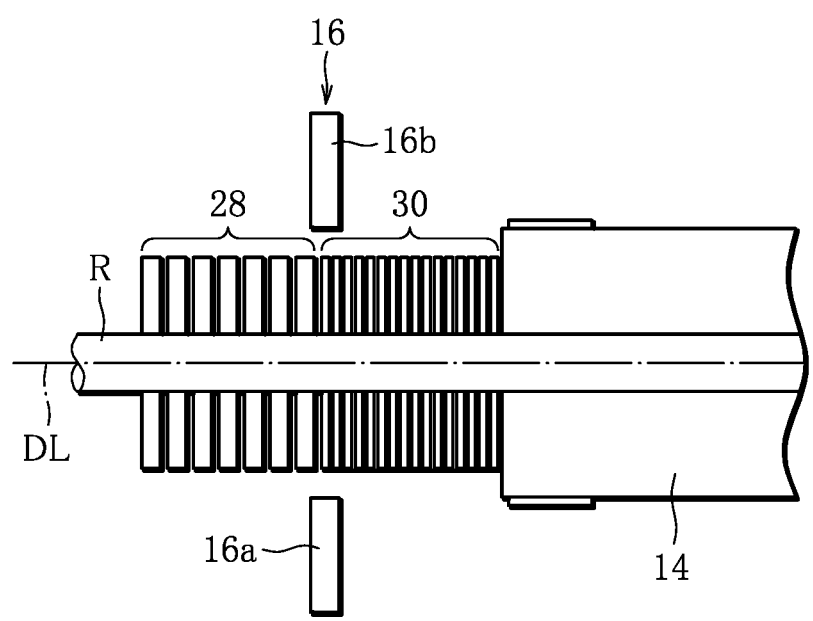
FIG. 4 is a schematic view showing a measurement device in a modification example.

For example, as shown in FIG. 4, the measurement device 16 may be disposed directly above the first and second roller conveyors 28 and 30. In this case, the light source 16a and the outer diameter sensor 16b are disposed to sandwich the delivery line DL of the rod member R therebetween and to be separated from each other in the horizontal direction.

According to the measurement device 16 as above, the space which allows passage of laser light does not have to be secured between the first roller conveyor 28 (the upstream section $U_{DL}$) and the second roller conveyor 30 (the downstream section $D_{DL}$ at the transfer conveyor 14 side). Therefore, as is obvious from FIG. 4, the first and second roller conveyors 28 and 30 can continue to each other, and delivery of the rod member R can be made more stable.

Further, on execution of the present invention, the drying device, that is, the air blower 26 is not always necessary, but forceful drying of the rod member R by the air blower 26 significantly contributes to shortening the delivery line DL. Hence, in addition to the air blower 26, another air blower may be also disposed under the first roller conveyor 28, for example, and air from the other air blower may be blown to the rod member R.

Further, each of the rollers of the second roller conveyor 30 may have the same diameter as the diameter of each of the rollers of the first roller conveyor 28.

EXPLANATION OF REFERENCE SIGNS

10 Extrusion-molding machine
14 Transfer conveyor
16 Measurement device
22 Cutting section
24 Post drying section
26 Air blower (Drying device)
28 First roller conveyor
30 Second roller conveyor
R Rod member
DL Delivery line
MP Measurement position
$U_{DL}$ Upstream section
$D_{DL}$ Downstream section
$A_D$ Pre-drying region
$A_C$ Conveyor region

The invention claimed is:
1. A rod member extrusion-molding system, comprising:
an extrusion-molding machine extruding a cylindrical rod member having a circular cross section;
a delivery line receiving the extruded cylindrical rod member;
a transfer conveyor receiving the cylindrical rod member from the delivery line, and transferring the received cylindrical rod member;
a measurement device before the transfer conveyor, the measurement device measuring an outer diameter of the cylindrical rod member when the cylindrical rod member passes through a measurement position defined on the delivery line, and outputting a measurement result;
a control device performing feedback control for a transfer speed of the cylindrical rod member by the transfer conveyor, based on the measurement result of the measurement device,
wherein the delivery line is divided into an upstream section at the extrusion-molding machine side and a downstream section at the transfer conveyor side with respect to the measurement position, the delivery line including:
a first roller conveyor forming a part of the upstream section at least directly, upstream of the measurement device, and guiding delivery of the cylindrical rod member, and
a second roller conveyor forming the downstream section, and guiding the delivery of the cylindrical rod member; and a drying device before the measurement device, the drying device pre-drying the cylindrical rod member as the cylindrical rod member passes through the upstream section of the delivery line, the drying device including a pre-drying region secured between the extrusion-molding machine and the first roller conveyor, and an air blower blowing air to the cylindrical rod member which passes through the pre-drying region from only below the cylindrical rod member in the upstream section of the delivery line, wherein pitches at which rollers are disposed in the first and second roller conveyors are equal to or smaller than a dimension of the cylindrical rod member in a direction perpendicular to a travel direction of the cylindrical rod member.

2. The rod member extrusion-molding system according to claim 1, wherein the pitches of rollers in the second roller conveyor are smaller than the pitches of rollers in the first roller conveyor.

3. The rod member extrusion-molding system according to claim 1, wherein the control device compares the outer diameter of the cylindrical rod member to a maximum diameter and a minimum diameter, and wherein the control device increases a speed of the transfer conveyor if the outer diameter of the cylindrical rod member is greater than the maximum diameter and decreases the speed of the transfer conveyor if the outer diameter of the cylindrical rod member is less than the minimum diameter.

4. A rod member extrusion-molding method, comprising:
an extruding step of extruding a cylindrical rod member having a circular cross section;
a delivery step of receiving the cylindrical rod member from the extruding step;
a transfer step of receiving the cylindrical rod member from the delivery step and transferring the received cylindrical rod member;
a measuring step of measuring an outer diameter of the cylindrical rod member at a measurement position during the delivery step of the cylindrical rod member and before the transfer step, and outputting a measurement result; and a control step of performing feedback control of a transfer speed of the cylindrical rod member by the transfer step, based on the measurement result in the measuring step, wherein the delivery step includes:
an initial stage process of delivering the cylindrical rod member by a first roller conveyor at least directly before the measuring step, and
a subsequent stage process of delivering the cylindrical rod member by a second roller conveyor between the measuring step and the transfer step,
a drying step of pre-drying the cylindrical rod member as the cylindrical rod member passes through the upstream section of the delivery line and before the measurement step, the drying step including a pre-drying region secured between the extrusion-molding machine and the first roller conveyor, and an air blower blowing air to the cylindrical rod member which passes through the pre-drying region from only below the cylindrical rod member in the upstream section of the delivery line, wherein the delivery step sequentially brings the cylindrical rod member received from the extruding step into contact with respective rollers of the first and second roller conveyors at intervals, the intervals being equal to or shorter than a dimension of the cylindrical rod member in a direction perpendicular to a travel direction of the cylindrical rod member.

5. The rod member extrusion-molding method according to claim 4, wherein in the subsequent stage process, a period in which each of the rollers of the second roller conveyor contacts the cylindrical rod member is shorter than a period in which each of the rollers of the first roller conveyor contacts the cylindrical rod member in the initial stage process.

6. The rod member extrusion-molding method according to claim 4, further comprising comparing the outer diameter of the cylindrical rod member to a maximum diameter and a minimum diameter; and increasing a speed of the transfer conveyor if the outer diameter of the cylindrical rod member is greater than the maximum diameter and decreasing the speed of the transfer conveyor if the outer diameter of the cylindrical rod member is less than the minimum diameter.

* * * * *